Oct. 13, 1931.  C. C. WILMORE  1,827,447
SLING FOR MOVING TREES
Filed Jan. 20, 1931
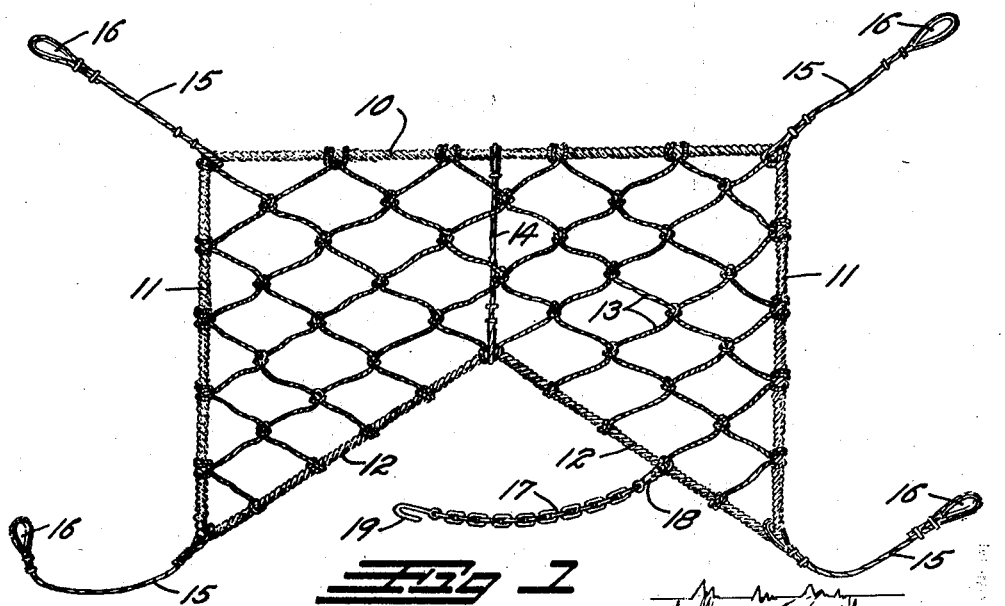
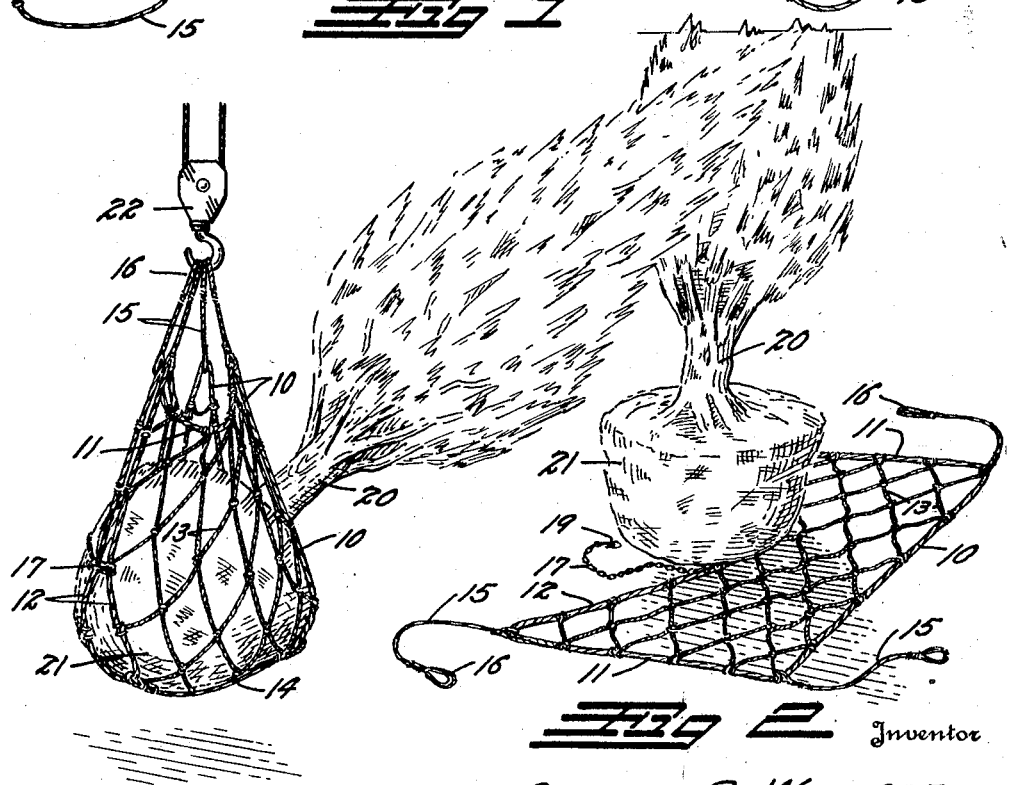
Inventor
CHARLES C. WILMORE
By R. H. Galbreath
Attorney Patented Oct. 13, 1931

1,827,447

UNITED STATES PATENT OFFICE

CHARLES C. WILMORE, OF WHEATRIDGE, COLORADO

SLING FOR MOVING TREES

Application filed January 20, 1931. Serial No. 509,946.

This invention relates to a sling for lifting and transplanting trees and has for its principal object the provision of a device of this character which will reduce the expense usually incurred in transplanting large trees.

Another object of the invention is to provide a tree sling which can be easily and quickly placed about the ball of earth carried by an excavated tree regardless of its position and weight so that the ball and the tree can be immediately lifted by any suitable hoisting device without breaking or disturbing the earth ball.

Formerly the transplanting of large trees required a number of men to lift and roll the earth ball upon the carrying device. This usually resulted in damage to the earth ball and was always an expensive proceeding. With the present invention one man can place the sling in position upon the earth ball regardless of the size and weight of the tree, and the sling prevents any damage to the ball during the lifting and transplanting of the tree.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved sling for transplanting trees.

Fig. 2 is a detail perspective view illustrating the sling being placed in position upon the earth ball of a tree.

Fig. 3 illustrates the tree and ball being lifted by means of the improved tree sling.

The sling comprises a specially shaped net, preferably formed of rope or a similar flexible medium. The net comprises a relatively heavy edge rope which completely surrounds the net forming a relatively straight side 10, two ends 11, and two inset diagonal portions 12. The net proper is formed by a relatively smaller mesh rope 13 knotted so as to form a relatively open mesh. The diagonal portions 12 form a V-shaped inset, the apex of which is tied to the side 10 by means of a cross cable 14. Each corner of the net is provided with a sling cable 15 terminating in a cable loop 16. A tie chain 17 is secured to one of the diagonal portions 12 by means of a swivel and link 18. The chain 17 terminates in an attachment hook 19.

In Figs. 2 and 3 a typical excavated tree is illustrated at 20 with its earth ball at 21. In applying the sling to the earth ball the diagonal portions 12 are drawn under the ball as far as possible, as shown in Fig. 2, so that the ball rests in the V-shaped inset. The two diagonals 12 are then tied together by means of the tie chain. Each of the sling cables 15 is then attached to the hoisting device, such as the hook of a pulley block 22, by means of the cable loops 16.

It will be noted that the entire tree ball can now be raised by the hoisting device without it having been necessary to lift the tree ball or pass any supporting members thereunder.

While the sling has been described as especially applicable to the transplanting of trees, it is desired to be understood that the invention is not limited to this specific use as it will be found equally valuable in lifting anything having approximately a similar shape.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A lifting sling comprising: a flexible fabric-like member, one side of said member being inset adjacent its mid-portion; and a tie member for securing the two sides of the inset portion together.

2. A lifting sling comprising: a flexible fabric-like member, one side of said member being inset adjacent its mid-portion; and a tie member for securing the two sides of the inset portion together; and supporting members extending from adjacent each corner of said fabric-like member.

3. A sling for lifting trees with an attached earth ball comprising: an open mesh net; an edging surrounding said net, said edging extending inwardly at one side of said net to form substantially a V-shaped inset; a tie member adapted to extend across said V-shaped inset so as to secure the sides thereof to each other.

4. A sling for lifting trees with an attached earth ball comprising: an open mesh net; an edging surrounding said net, said edging extending inwardly at one side of said net to form substantially a V-shaped inset; a tie member adapted to extend across said V-shaped inset so as to secure the sides thereof to each other; and sling cables secured adjacent each corner of said net and arranged for attachment to a hoisting device.

5. A sling for lifting trees with an attached earth ball comprising: an open mesh net; an edging surrounding said net, said edging extending inwardly at one side of said net to form substantially a V-shaped inset; a tie member adapted to extend across said V-shaped inset so as to secure the sides thereof to each other; and a cross member extending from the apex of said V-shaped inset to the opposite side of said net.

6. A sling for lifting trees with an attached earth ball comprising: an open mesh net; an edging surrounding said net, said edging extending inwardly at one side of said net to form substantially a V-shaped inset; a tie member adapted to extend across said V-shaped inset so as to secure the sides thereof to each other; a cross member extending from the apex of said V-shaped inset to the opposite side of said net; and sling members extending from adjacent the corners of said net and arranged for attachment to a hoisting device.

7. A lifting sling comprising: an edge rope, three substantially straight portions on said edge rope forming one side and two ends; two diagonal, inwardly extending portions on the other side forming a V-shaped inset; a mesh rope entwined within the outline of said edge rope so as to form an open mesh net therein; and means for attaching a hoisting device adjacent the corners of said edge rope.

8. A lifting sling comprising: an edge rope, three substantially straight portions on said edge rope forming one side and two ends; two diagonal, inwardly extending portions on the other side forming a V-shaped inset; a mesh rope entwined within the outline of said edge rope so as to form an open mesh net therein; and means for attaching a hoisting device adjacent the corners of said edge rope; and a tie member permanently attached to one of the diagonal, inwardly extending portions and arranged for engagement with the other diagonal, inwardly extending portion.

9. A lifting sling comprising: an edge rope, three substantially straight portions on said edge rope forming one side and two ends; two diagonal, inwardly extending portions on the other side forming a V-shaped inset; a mesh rope entwined within the outline of said edge rope so as to form an open mesh net therein; and means for attaching a hoisting device adjacent the corners of said edge rope; a tie member permanently attached to one of the diagonal, inwardly extending portions and arranged for engagement with the other diagonal, inwardly extending portion; and a cross member extending from the apex of said V-shaped inset to said first side.

In testimony whereof, I affix my signature.

CHARLES C. WILMORE.